Patented June 17, 1952

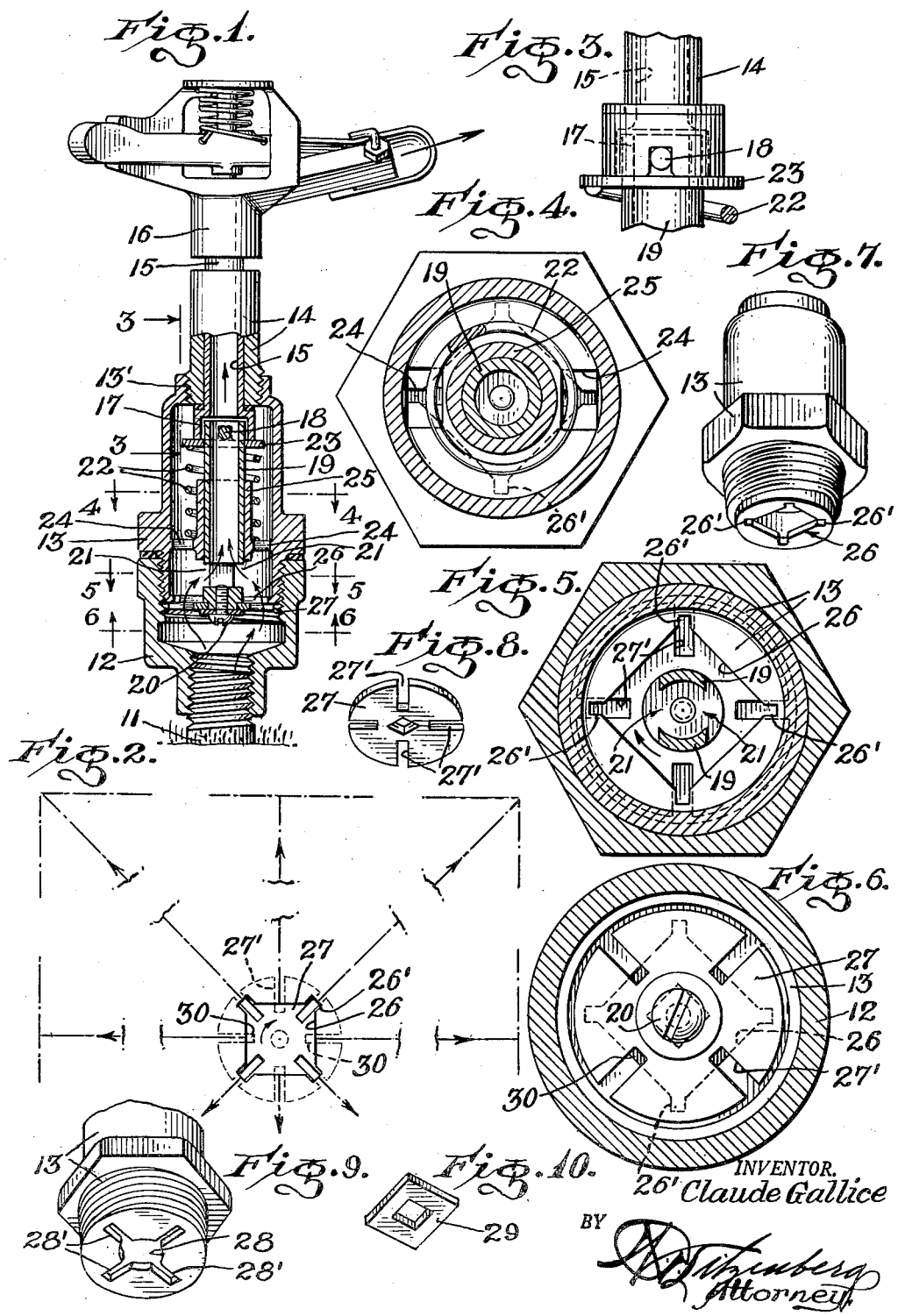

2,600,987

UNITED STATES PATENT OFFICE 2,600,987

REVOLVING LAWN SPRINKLER

Claude Gallice, Oceanside, Calif.

Application October 20, 1950, Serial No. 191,197

4 Claims. (Cl. 299—18)

This invention relates to revolving lawn sprinklers, and more particularly to revolving lawn sprinklers having means for automatically distributing the water thrown therefrom over a square area instead of over a uniformly round area.

The invention is even more particularly designed as an attachment to be interposed between the connection with a source of supply of water under pressure and a revolving sprinkler head, whereby the admission of water into the chamber of said sprinkler head is automatically varied from a minimum inflow to a maximum inflow, thus varying the distance the water is thrown from a short to a longer distance, the longer distance forming the corners of the area being sprinkled and the gradually shortening distances forming the sides of the area between corners.

In order to explain my invention more in detail, I have illustrated one practical embodiment thereof on the accompanying sheet of drawings, on which:

Figure 1 is a side elevation of a revolving lawn sprinkler in which my invention is embodied, said figure being partly in vertical section to show the application of the invention thereto;

Figure 2 is a diagrammatic view, with parts broken out to reduce the size of the figure, showing the relationship of valve elements to accomplish the desired purpose;

Figure 3 is a fragmentary side view of what is seen from line 3—3 on Fig. 1;

Figure 4 is a cross sectional view taken on the line 4—4 on Fig. 1, somewhat enlarged;

Figure 5 is a similar view taken on the line 5—5 on Fig. 1, looking in the direction of the arrows;

Figure 6 is a similar view taken on line 6—6 on Fig. 1 and looking upwardly to the bottom of the revolving valve element;

Figure 7 is a perspective view of the body of the invention with parts removed to show the bottom opening and over which the revolving valve element is placed;

Figure 8 is a perspective view of the revolving valve element;

Figure 9 is a fragmentary perspective view of a slightly modified form of invention body in which the bottom opening is made in the form of the opening in the valve element shown in Fig. 8, with a round open center instead of the small square center opening; and Figure 10 is a perspective view of a square valve element to be used over the bottom of said body as seen in Fig. 9.

Referring now in detail to the drawings, a water supply pipe is designated 11, with a coupling member 12 thereon, threaded interiorly to receive the lower end of the body 13 of the attachment which constitutes the invention proper. The upper end of said attachment body 13 is reduced and interiorly threaded to receive a bearing sleeve 14, for the stem 15 of a revolving sprinkler head 16.

The lower end of said sprinkler head stem 16 is formed into a cup-like coupler as 17, to fit down over a cross pin 18, in the upper end of a tubular member 19, which terminates at its lower end in a solid square, with a threaded bore therein to receive a holding screw 20. Said tubular member 19 is open at its opposite sides, immediately above said square end, to permit inflow of water, as at 21, 21, and as indicated by the arrows, from the supply pipe 11 to the tubular member 19 and to the sprinkler head. A coiled spring 22 on said tubular member 19 bears at its upper end on a washer 23, on said sleeve 19, under the cross pin 18, and on its lower end said spring bears down upon cross arms, as 24, in the body 13, and supporting a bearing sleeve 25, for said tubular member 19, as seen in Fig. 1. The cup-like coupling 17 between the tubular member 15 and the upper end of the member 19, over the pin 18, is also seen in Fig. 3.

The lower end or bottom of the attachment body 13 is closed but with a square opening, as 26, therethrough, and with the corners thereof slightly extended, as seen in Fig. 7, at 26′, 26′, for a purpose again referred to. This bottom opening of said attachment body functions as a valve element, or is a particular opening over which a special valve element fits and functions as it is revolved with the sprinkler head through the connections 15, 19 and 20.

A second valve element, of special form, designated 27, Fig. 8, is mounted on the lower square end of said tubular member 19, to bear flatwise up against the bottom of said attachment body 13, over said square opening 26, whereby to cooperate therewith in admitting water up into the tubular member 19 and on up to the sprinkler head 16.

This special valve element 27 has four radial slots, as 27′, 27′, formed therein, as clearly shown in Fig. 8, and also in Fig. 2, where said special valve element 27 with its radial slots 27′ is shown in light broken lines in two positions, the one where the slots are at the corners shows the maximum opening for water to flow up through the same as indicated by the arrows in Fig. 1, and the other to show the minimum opening, as at 30, 30, Figs. 2 and 6, for less water to flow up through said valve elements. Said second valve element 27 is secured in place on the square end of said tubular member 19, by the screw 20, as shown in Fig. 1, with the necessary washers to insure a nonleak fit.

In Fig. 9, I have shown the bottom of the member 13 provided with a form of opening similar to the form of the special valve element with an open center and the radial slots, as at 28 and 28', and then use a square valve element 29, Fig. 10, to fit over said bottom and to revolve thereon, thus changing the size of the inflow openings in the same general manner as in the other form of the invention. In other words, the structure is just reversed, with the two flat valve elements cooperating as one is turned relative to the other to permit maximum and minimum inflow with a graduation between said extremes, to form the straight sides of a square area being sprinkled. Said square valve element 29 would be mounted on the square lower end of the tubular member 19, and be held in place by the screw 20, as is illustrated in Fig. 1, just as was valve element 27, and are revolved therewith and with the sprinkler head. In other words, the revolving sprinkler head turns the special valve element, whether 27, or 29, to automatically open and close the inflow openings from the source of supply 11 up through the members 19 and 15 to said sprinkler head.

Thus I have provided an attachment body to be interposed between a supply pipe for water under pressure and a sprinkler head of the revoluble type, said attachment having means therein to automatically control the discharge of water over an area of square form, said control means including two valve elements, flatwise together at the bottom of said attachment body, with related openings therethrough, whereby the revolving of one of said valve elements automatically and successively opens and closes the inflow openings into and up through said sprinkler, whereby when said openings are open the water is discharged over the longer radii and to the corners of a square area, and when said openings are being gradually closed or reduced in area, water is discharged over gradually shortened radii, and to the straight sides of the area being sprinkled, between opposite corners.

This improved mechanism provides a very simple, practical and efficient sprinkler head of the revoluble type with means for automatically controlling the discharge of the water discharged therefrom to cover a square area in the manner illustrated.

I do not limit the invention to the particular details of construction and arrangement here shown and described, except as I may be limited by the hereto appended claims.

I claim:

1. The combination with a revoluble sprinkler head and a supply pipe for water under pressure, of an attachment body to be connected at its lower end with said supply pipe, and at its upper end to said sprinkler head to revolubly support the same, the bottom of said attachment body having an inflow opening therethrough into said body, whereby said bottom functions as one valve element, a second valve element mounted flatwise against the underside of said bottom and over said opening, and operatively connected with said sprinkler head to rotate therewith, one of said valve elements having four radially extended slots therethrough in the direction of four corners and through which water can flow in the line of said slots, and the other valve element having four angle edges relative to said radial slots, whereby when one of said valve elements is rotated relative to the other said edges gradually cover said slots with a shearing movement to close and to open said slots from minimum to maximum for the discharge of varying amounts of water therethrough.

2. The combination with a revoluble sprinkler head and a supply pipe for water under pressure, of an attachment body to be connected at its lower end with said supply pipe, and at its upper end to said sprinkler head to revolubly support the same, the bottom of said attachment body having a square inflow opening therethrough into said body, whereby said bottom functions as one valve element, a second valve element of flat form and having four radial slots therethrough at the four sides thereof with its center connected up through said body to said sprinkler head to turn therewith, said second valve element being revolubly held flatwise up against the bottom of said attachment body and over said square opening, whereby as it is turned relative to said bottom and said square opening its radial slots move from corner to corner of said opening and are opened and closed by the solid wall of said bottom for varying the amount of water discharged through said radial slots and to said sprinkler head, in the manner illustrated.

3. A claim as set forth in claim 2 in which the square opening in the bottom of the attachment body has its corners slightly extended.

4. A claim as set forth in claim 1, which includes a spring in said attachment body and operating to hold said second valve element yieldingly against the bottom of said body as it is revolved thereon.

CLAUDE GALLICE.

REFERENCES CITED

The following references are of record in the file of this patent:

UNITED STATES PATENTS

| Number | Name | Date |
|---|---|---|
| 2,376,007 | Quigley | May 15, 1945 |

FOREIGN PATENTS

| Number | Country | Date |
|---|---|---|
| 555,810 | France | Mar. 31, 1923 |